United States Patent [19]

MacTaggart et al.

[11] Patent Number: 5,689,692

[45] Date of Patent: Nov. 18, 1997

[54] METHOD AND APPARATUS FOR DECODING AN ENCODED NRZ SIGNAL

[75] Inventors: Iain Ross MacTaggart, Eden Prarie; David E. Tetzlaff, Minnetonka, both of Minn.

[73] Assignee: Honeywell Inc., Minneapolis, Minn.

[21] Appl. No.: 996,224

[22] Filed: Dec. 23, 1992

[51] Int. Cl.[6] .................. G06F 1/12; G06F 1/14; H04L 25/49; G11B 20/10

[52] U.S. Cl. .................. 395/558; 395/800; 360/40; 360/41

[58] Field of Search .................. 395/200, 325, 395/550, 700, 725, 500, 275, 375, 250, 425, 2, 2.12, 2.13, 2.14, 2.15, 2.16, 2.21, 2.22, 2.26, 2.27, 2.37, 575, 289, 810, 280, 185.01; 364/DIG. 1, DIG. 2, 715.04, 724.03, 481; 375/34, 4, 119, 22, 120, 340, 376; 340/825.07, 825.54; 360/40, 64, 41

[56] References Cited

U.S. PATENT DOCUMENTS

| | | | |
|---|---|---|---|
| 3,818,501 | 6/1974 | Fiorino | 360/40 |
| 4,151,469 | 4/1979 | Frutiger | 375/34 |
| 4,312,070 | 1/1982 | Coombes et al. | 371/40 |
| 4,425,645 | 1/1984 | Weaver et al. | 371/47 |
| 4,501,000 | 2/1985 | Immink et al. | 375/25 |
| 4,592,072 | 5/1986 | Stewart | 375/55 |
| 4,654,704 | 3/1987 | Lippel | 360/41 |
| 4,720,687 | 1/1988 | Ostoich et al. | 331/1 A |
| 4,881,243 | 11/1989 | Whitt | 375/4 |
| 4,922,537 | 5/1990 | Frederiksen | 395/2.21 |
| 4,983,972 | 1/1991 | Mills | 341/143 |
| 5,042,053 | 8/1991 | Hoppes | 375/106 |
| 5,056,116 | 10/1991 | Shimada et al. | 375/94 |
| 5,073,905 | 12/1991 | Dapper et al. | 375/106 |
| 5,208,839 | 5/1993 | Hladik et al. | 375/110 |

OTHER PUBLICATIONS

M. Banu and A.E. Dunlap, "Clock Recovery Circuits with Instantaneous Locking", published Nov. 5, 1992, in the Electronic Letters.

Primary Examiner—Daniel H. Pan
Attorney, Agent, or Firm—John G. Shudy, Jr.

[57] ABSTRACT

A bit serial decoder is disclosed decoding an encoded non-return to zero (NRZ) signal without the use of external clock. Transitions within the encoded NRZ signal cause a differential voltage signal to be output. This differential voltage increases at a constant rate between two transitions. At the second transition the magnitude of the differential voltage is compared to a preset value to determine a number of consecutive like bits. These consecutive bits can then be transmitted in one step to a storage means.

18 Claims, 10 Drawing Sheets

| Storage Register | 130a | 130b | 130c | 130d | 130e | 130f | 130g | 130h | 130i | 130j | 130k | 130m | 130n | 130p |
|---|---|---|---|---|---|---|---|---|---|---|---|---|---|---|
| 136 | 1 | — | — | — | — | — | — | — | — | — | — | 0 | 1 | 0 |
| 137 | — | — | — | — | 0 | 0 | 0 | 0 | 1 | 1 | 1 | 0 | 1 | 0 |
| 138 | — | — | — | 1 | 1 | 1 | 1 | 1 | 1 | 1 | 1 | 0 | 1 | 1 |
| 139 | — | — | — | 1 | 1 | 1 | 1 | 1 | 1 | 1 | 1 | 0 | 0 | 1 |
| 140 | — | — | — | — | — | — | — | — | — | — | 0 | 1 | 0 | 0 |
| 141 | — | — | — | — | — | — | — | — | — | — | 1 | 0 | 0 | 0 |
| 142 | — | — | — | — | — | — | — | — | — | — | 1 | 1 | 0 | 0 |
| 143 | — | — | — | — | — | — | — | — | — | — | — | 1 | 1 | 0 |

| $c_{11,12}$ | $c_{12,22}$ | $c_{13,23}$ | $c_{14,24}$ |
|---|---|---|---|
| 1 | 0 | 0 | 0 |
| 1 | 1 | 0 | 0 |
| 1 | 1 | 1 | 0 |
| 1 | 1 | 1 | 1 |

Fig. 9B

| S1 S2 | 0 0 | 0 1 | 1 0 | 1 1 |
|---|---|---|---|---|
| | 0 | 0 | 1 | 1 |

METHOD AND APPARATUS FOR DECODING AN ENCODED NRZ SIGNAL

FIELD OF THE INVENTION

This invention relates to data processing systems, and more specifically, to a system for decoding a digital bit stream which is transmitted within a digital data communication system.

BACKGROUND OF THE INVENTION

Digital information is commonly transmitted between different data processing systems via an electronic signal. The information is encoded in a series of high and low pulses which are transmitted, decoded, and then stored in temporary memory registers. This signal is commonly known as nonreturn-to-zero (NRZ).

In most data transmission systems, the NRZ signal is encoded so that the number of consecutive like bits in the bit stream is limited to a particular number. This is done in order to avoid errors in the reading of the data. A well known encoding scheme such as 4B5B limits the number of like bits which may be transmitted to either four or five before a transition in the electronic signal, or bit stream, will occur.

When digital data is transmitted via a serial bit stream, difficulties may be encountered in finding the proper means to extract the data from the incoming bit stream. One decoding method provides a clock signal which controls at what intervals the incoming data is read or sampled. In most cases the pulses from a voltage control oscillator are used as a clock. Every time a pulse is output from the oscillator, a reading is taken from the bit stream.

In systems which use a clock signal to decode, means must be provided to synchronize the clock signal with the incoming bit stream. This can be done by including a preamble in the bit stream. This preamble is at the beginning of the bit stream and contains a series of test signals which align the clock with the incoming data. If the data stream and the clock are not properly synchronized, data will be read at the wrong time, possibly causing multiple bit errors.

Any system which uses clock signals may be susceptible to noise which may appear in the signal of the digital data stream. Noise or frequency variations in the bit stream can cause the data and the clock to become misaligned which in turn causes bit errors. Also, a preamble degrades link latency when multiple sources are to be received, thus slowing the system.

Another type of prior art system includes the timing signal in the digital bit stream itself. The decoder has an internal clock and means are provided to synchronize this clock with the timing signal in the bit stream. This system has the same drawbacks as the system described above in that an external clock is still needed to read the data, and valuable time is used in synchronizing the clock and the data.

Thus there is a need to provide a digital bit stream decoder which does not rely on an external clock signal.

SUMMARY

Therefore, there is provided a method for decoding an encoded NRZ signal in which no external clocking signals are required. When the Encoded NRZ signal is received by the system, a transition is detected in the data. At this transition, a signal is output which increases in magnitude at a constant rate. When the next transition in the data is detected, the magnitude of the signal ceases to change. The final magnitude of the signal is then compared to stored reference values in order to determine the number of consecutive like bits that have been transmitted through the encoded NRZ signal. Depending on whether the first transition is a rising or falling edge, the system determines whether each of the bits in the series of consecutive bits is either a "1" or a "0". These consecutive bits then can be transmitted to a storage register and then output in the desired format.

It is an object of this invention to provide a method for decoding an encoded NRZ signal.

It is another object of this invention to provide a method for decoding an encoded NRZ signal without the use of an external dock signal.

It is still another object of this invention to provide an apparatus for decoding an encoded NRZ signal which does not require the use of an external dock.

DETAILED DESCRIPTION OF THE PREFERRED EMBODIMENTS

Figure 1:
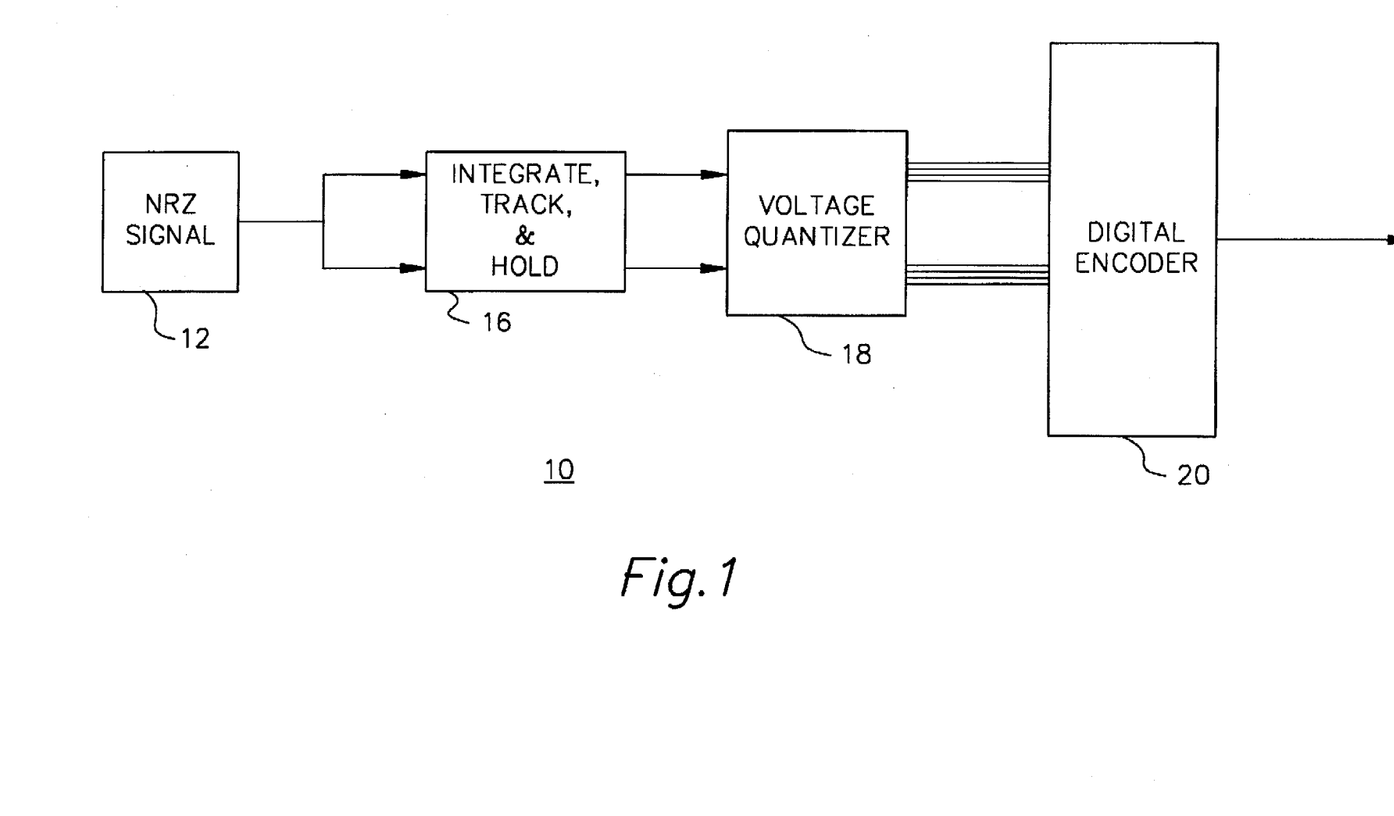
FIG. 1 is a block diagram of the bit stream decoder.

In FIG. 1, there is shown a block diagram of one embodiment of decoder 10. The encoded NRZ signal 12 is created remote from the decoder and is transmitted to the integrate track and hold circuit 16. The integrate track and hold circuit 16 outputs two signals to the voltage quantizer 18. The voltage quantizer 18 outputs eight signals in the groups of four to the digital encoder 20. The digital encoder 20 outputs the data in the desired format.

Figure 2:
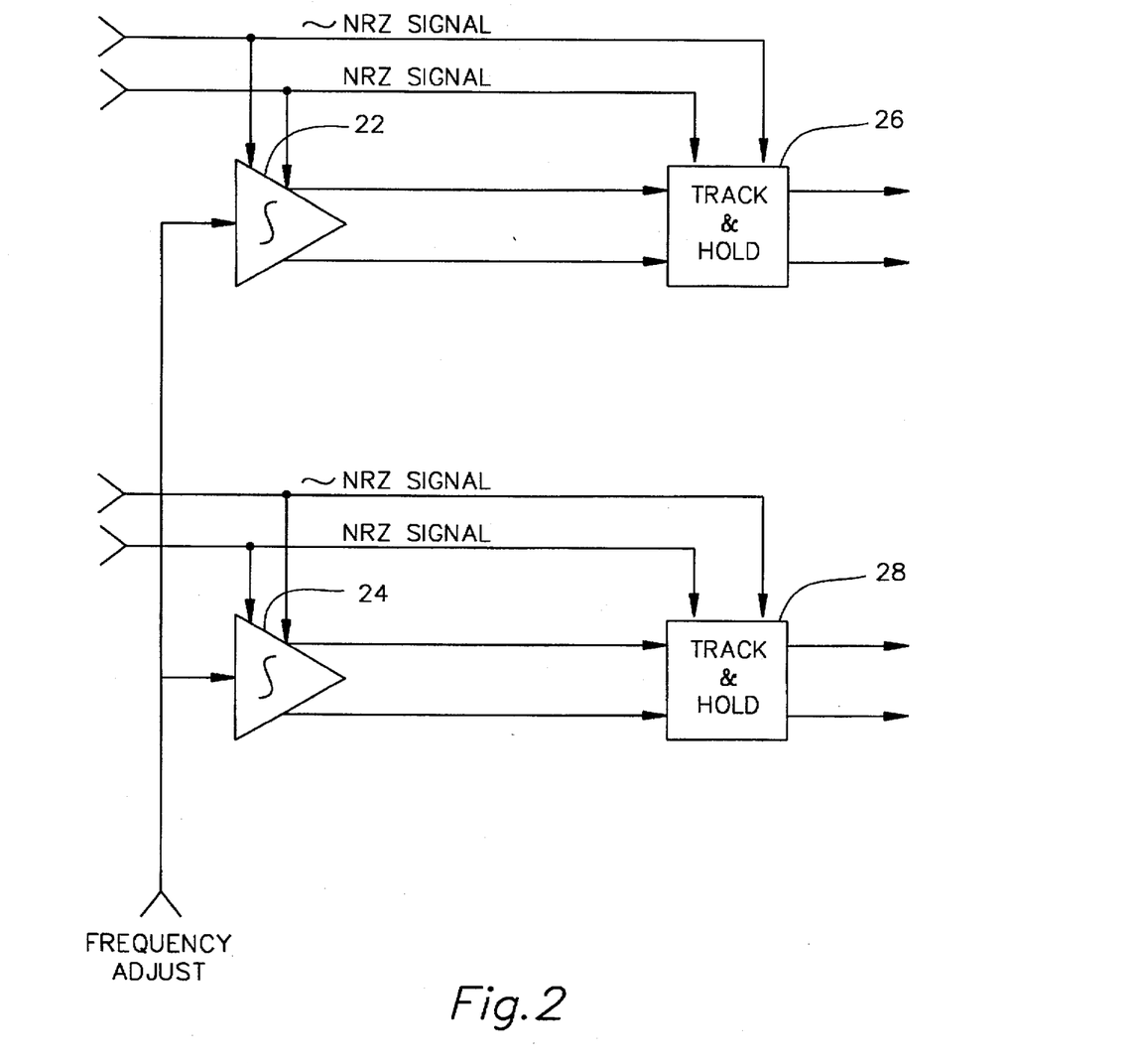
FIG. 2 is a block diagram of the integrate, track and hold circuit.

The integrate track and hold circuit is shown in more detail in FIG. 2. The integrate track and hold circuit 16 is comprised of differential voltage integrators 22 and 24, as well as track and hold circuits 26 and 28. Differential voltage integrators 22 and 24 receive the encoded NRZ signal as well as its inverse, or complement. Each integrator also receives the frequency adjust signal. The encoded NRZ signal and its complement are also transmitted to track and hold circuits 26 and 28. The track and hold circuits then output a differential voltage.

Figure 3:
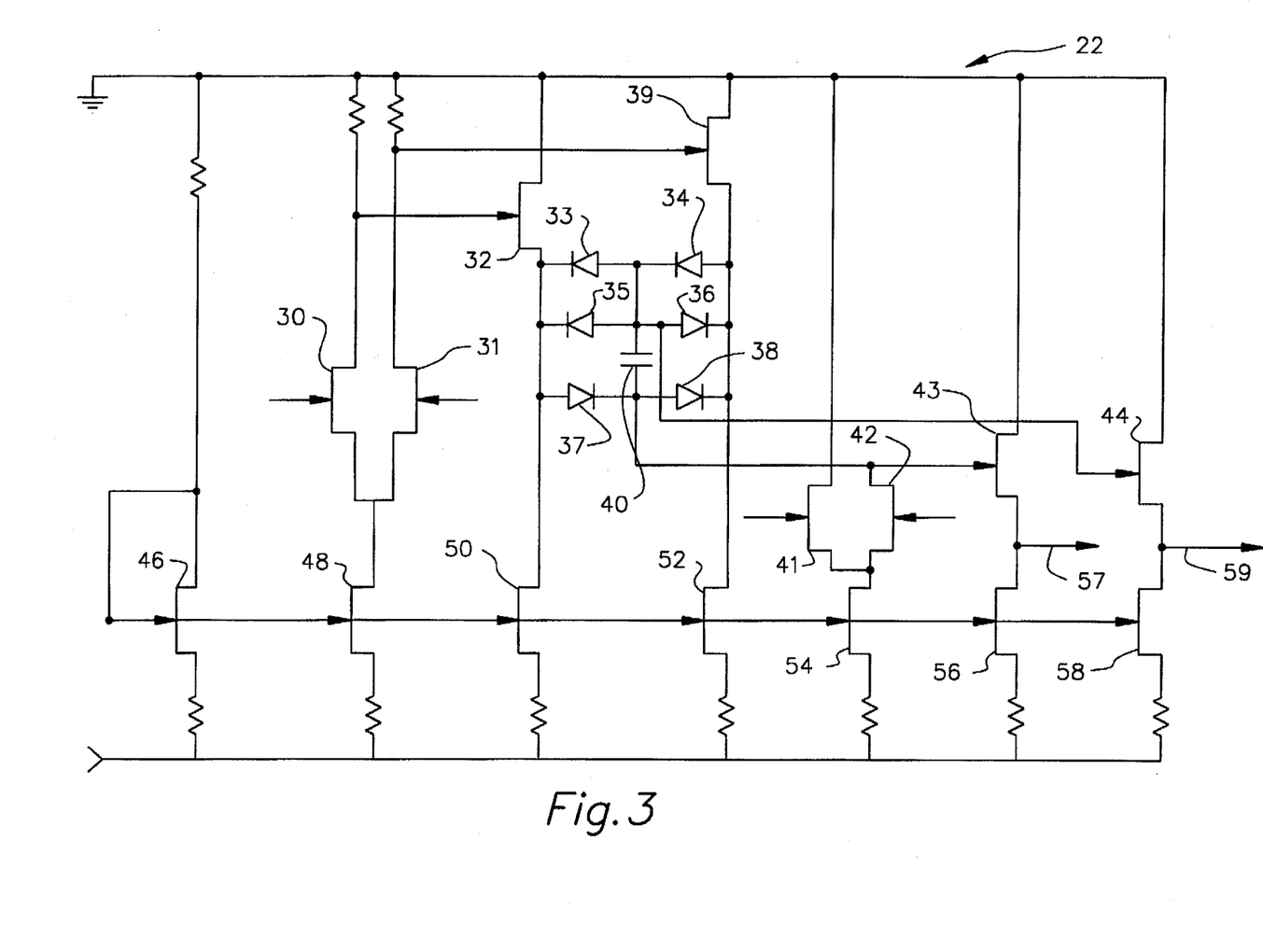
FIG. 3 is a circuit diagram for the integrator circuit.

A circuit diagram for differential integrator 22 is shown in FIG. 3. In voltage integrator 22, the encoded NRZ signal runs to the gate of field effect transistor (FET) 30. The NRZ complement runs to the gate of FET 31. The drain of FET 31 runs to the gate of FET 39 while the drain of FET 30 runs to the gate of FET 32. Between the sources of FET's 32 and 39 are diodes 33–38, as well as capacitor 40. One plate of capacitor 40 is connected to the gate of FET 43 and the drain of FET 42, while the other plate is connected to the gate of FET 44. The encoded NRZ signal is also received at the gate of FET 42, and the NRZ complement is received at the gate of FET 41. Lines 57 and 59, connected to the sources of FET's 43 and 44, act as outputs for the circuit. FET's 46–58 provide current mirror and constant current sources for the circuit. In the preferred embodiment, voltage source $V_{SS}$ is approximately 5 volts below ground.

Differential voltage integrators 22 and 24 are identical in construction except for at what locations the encoded NRZ signal and its complement are received. In differential voltage integrator 24, the encoded NRZ signal is received at the gates of FET's 31 and 41, while the complement of the encoded NRZ signal is received at the gate of FET's 30 and 42.

The purpose of the integrator circuits is to output a ramping differential voltage in response to either a high or low encoded NRZ signal. When the encoded NRZ signal is high, FET's 30 and 42 in integrator 22 will turn on and FET's 31 and 41 will remain off. FET 30 will conduct current creating a low signal at the gate of FET 32. FET 31 will not conduct, creating a high signal at the gate of FET 39. FET 39 will turn on and conduct current through diodes 33 and 34, which creates a reference voltage across capacitor 40. The high encoded NRZ signal will also cause FET 42 to turn on causing current to be conducted through capacitor 40. This current is constant and will cause a potential to build up across the capacitor. The magnitude of the potential will be proportional to the time that the encoded NRZ signal remains high. The potential buildup across the capacitor will be sensed at the gates of FET's 43 and 44. The voltage across the sources of FET's 43 and 44 will be proportional to the potential across the capacitor. This potential then can be output as the differential voltage $V_1$ across lines 57 and 59.

When the encoded NRZ signal is low, FET 30 is turned off and FET 31 is turned on. This will cause a large current to flow through diodes 35, 36, 37 and 38. Due to diode symmetry, this results in a zero voltage across the capacitor 40. Once the potential across the capacitor has been removed, the circuit is then ready to begin building a charge again.

The track and hold circuits 26 and 28 receive the voltage signal from the integrators, store the charge received, and then output a constant differential voltage signal which is equal to the final magnitude of the signal received from the integrator. The operation of the track and hold circuit can be understood from the circuit diagram shown in FIG. 4.

Figure 4:
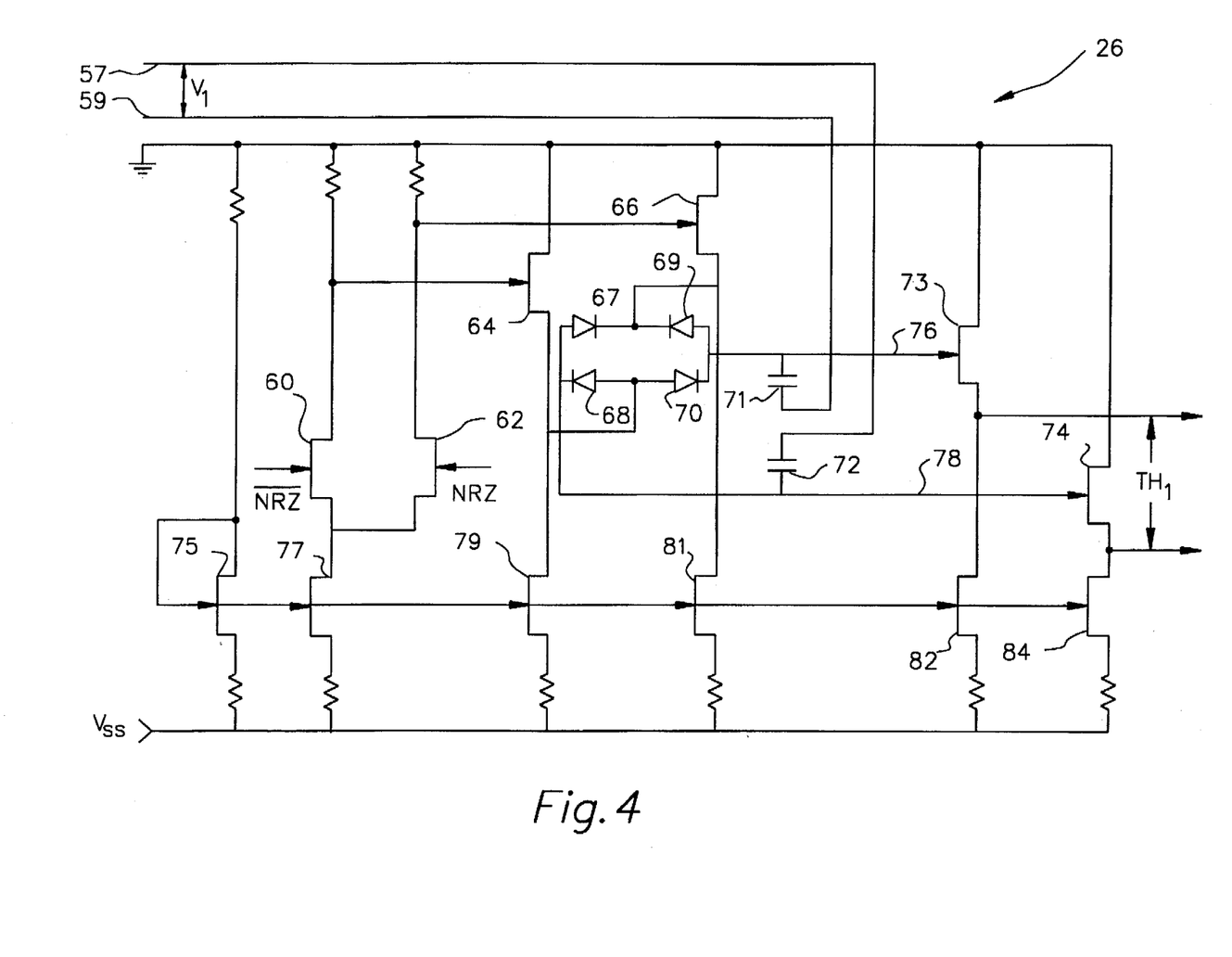
FIG. 4 is a circuit diagram for the track and hold circuit.

In track and hold circuit 26 shown in FIG. 4, the encoded NRZ signal is transmitted to the gate of FET 62 while the complement of the encoded NRZ signal is transmitted to the gate of FET 60. The drain of FET 62 is connected to the gate of FET 66, while the drain of FET 60 is connected to the gate of FET 64. The source of FET 64 is connected to the anodes of diodes 68 and 70, while the source of FET 66 is connected to the cathodes of diodes 67 and 69. The anode of diode 67 and the cathode of diode 68 are connected to one plate of capacitor of 72, while the other plate is connected to line 57. The anode of diode 69 and the cathode of diode 70 are connected to one plate of capacitor 71, while the other plate of capacitor 71 is connected to line 59. The gate of FET 73 is also connected to capacitor 71 while the gate of FET 74 is connected to capacitor 72. The sources of FET's 73 and 74 will sense the voltage difference across lines 76 and 78. The sources of FET's 73 and 74 will carry the differential voltage TH1. FET's 75–84 act as a current mirror and as constant current sources for the circuit. As in the voltage integrators, $V_{ss}$ is approximately 5 volts below ground.

The track and hold circuits 26 and 28 are identical in construction. Like the differential voltage integrators, they differ in where the encoded NRZ signal is received. In track and hold circuit 28, the encoded NRZ signal is transmitted to the gate of FET 60 while the complement of the encoded NRZ signal is transmitted to the gate of FET 62.

In the operation of track and hold circuit 26, differential voltage $V_1$ is received at capacitors 71 and 72. While the circuit is tracking the differential voltage output by the integrating circuit, a high signal is received at FET 62 and a low signal is received at FET 60. The low signal at FET 60 turns on FET 64, which conducts current through diodes 68 and 70. As the differential voltage $V_1$ ramps up, a charge builds across capacitors 71 and 72. When the differential voltage peaks, the encoded NRZ signal at FET 62 goes low and its complement goes high at FET 60. At this point differential voltage $V_1$ is zero, and a voltage exists across lines 76 and 78. This voltage difference will be sensed by FET's 73 and 74. Diodes 67 through 70 prevent any leakage so that a constant voltage difference can be sustained. The differential voltage $TH_1$ is output across the sources of FET's 73 and 74.

Figure 5:
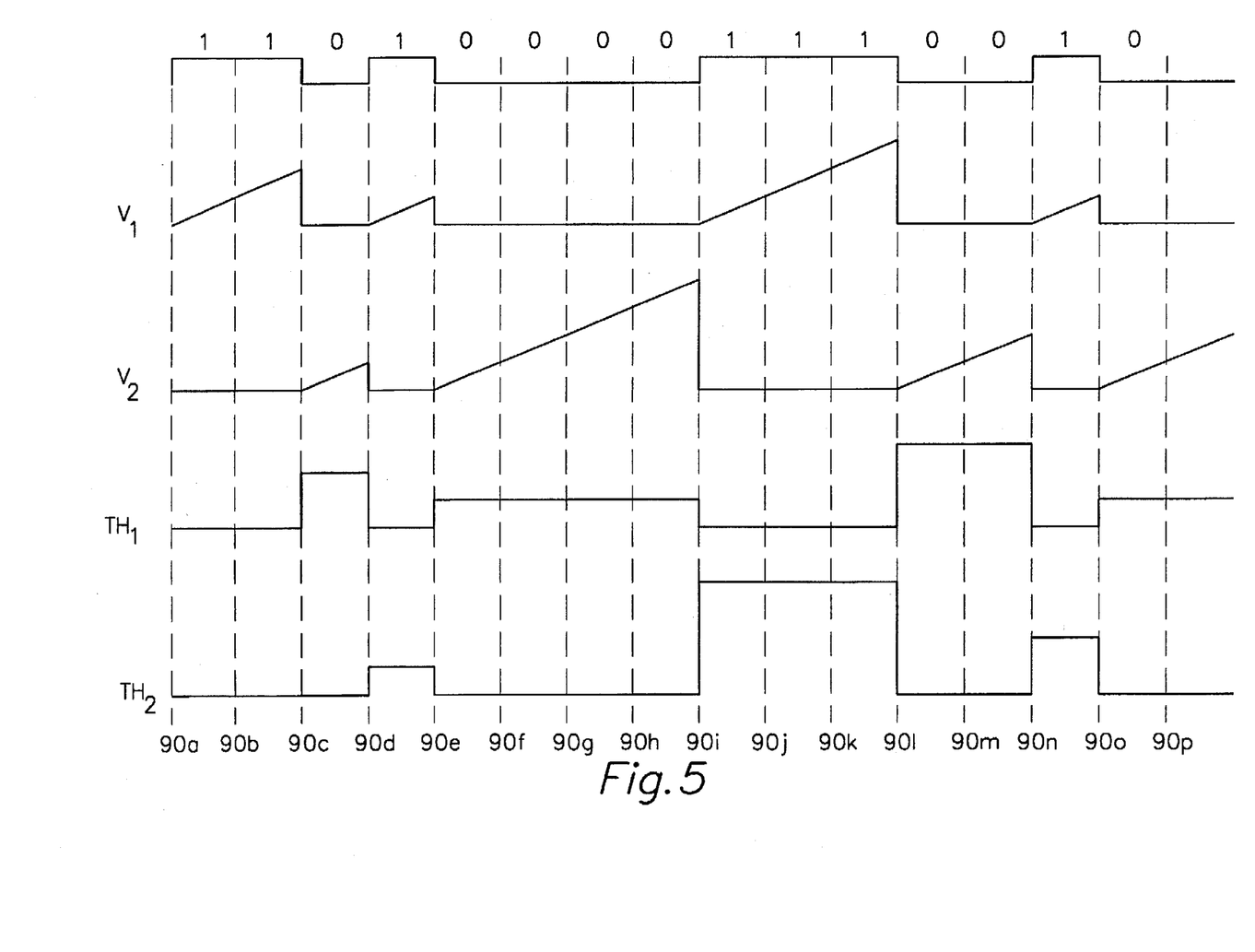
FIG. 5 is a timing diagram showing the output of the integrator circuit and output of the track and hold circuit.

In FIG. 5, an example of the outputs of the integrators and the track and hold circuits are shown together in a timing diagram to illustrate the operation of the various circuits. The outputs of integrators 22 and 24 are represented by differential voltages $V_1$ and $V_2$, respectively. The outputs of track and hold circuits 26 and 28 are represented by differential voltages $TH_1$ and $TH_2$, respectively. In time period 90a–90c, the encoded NRZ signal is high and integrator 22 outputs differential voltage $V_1$. During this first time period, none of the track and hold circuits output a signal. At 90c, the encoded NRZ signal goes low and $V_1$ returns to zero. At this point, integrator 24 begins to output signal $V_2$. During the time that $V_2$ is increasing in magnitude, track and hold circuit 26 outputs a differential voltage signal which is equal to the final magnitude of $V_1$ at 90c. $TH_1$ will be sustained at this level as long as the encoded NRZ signal is low. At 90d, the encoded NRZ signal goes high again and $V_2$ returns to zero. At this time, $TH_2$ rises to the final magnitude of $V_2$. The differential voltage $TH_2$ is output only as long as the encoded NRZ signal remains high. This process is continued for time periods 90d–90p.

Figure 6:
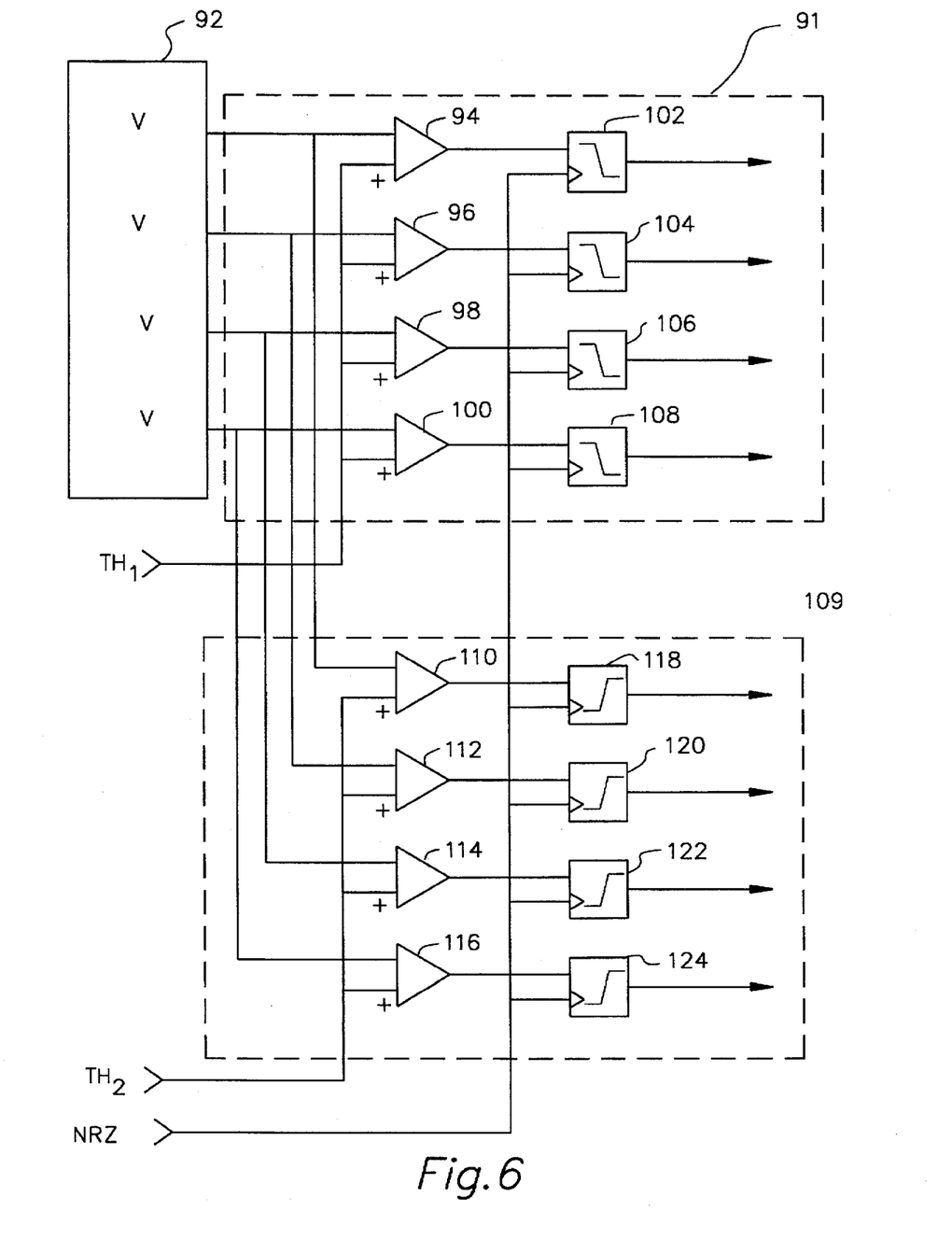
FIG. 6 is a circuit diagram of the voltage quantizer.

The circuit diagram for the voltage quantizer 18 is shown in FIG. 6. The quantizer is separated into two subquantizers, 91 and 109, each of which receives either signal $TH_1$ or $TH_2$. In this embodiment of the invention, each of the subquantizers is made up of four comparators and four latches. Subquantizer 91 receives signal $TH_1$ and has comparators 94, 96, 98 and 100 as well as latches 102, 104, 106 and 108. Subquantizer 109 receives signal $TH_2$ and has comparators 110, 112, 114 and 116 as well as latches 118, 120, 122 and 124. Also included in the voltage quantizer is the differential voltage reference source 92. The differential voltage reference source outputs four differential voltage levels each of which runs to a particular negative node of a comparator. $V_4$ runs to comparators 94 and 110, $V_3$ runs to comparators 96 and 112, $V_2$ runs to comparators 98 and 114, and $V_1$ runs to comparators 100 and 116. The encoded NRZ signal runs to all of the latches and will trigger the latches in subquantizer 91 on a falling edge, and will trigger the latches in subquantizer 109 on a rising edge. The differential reference voltages are set at preset levels which cascade down in magnitude from $V_4$ to $V_1$. Each of the comparators will compare a particular reference voltage with the signal it receives from the track and hold circuit. This circuit is designed so that the higher the incoming signal from the track and hold circuit, the more comparators that will trip.

Figure 7A:
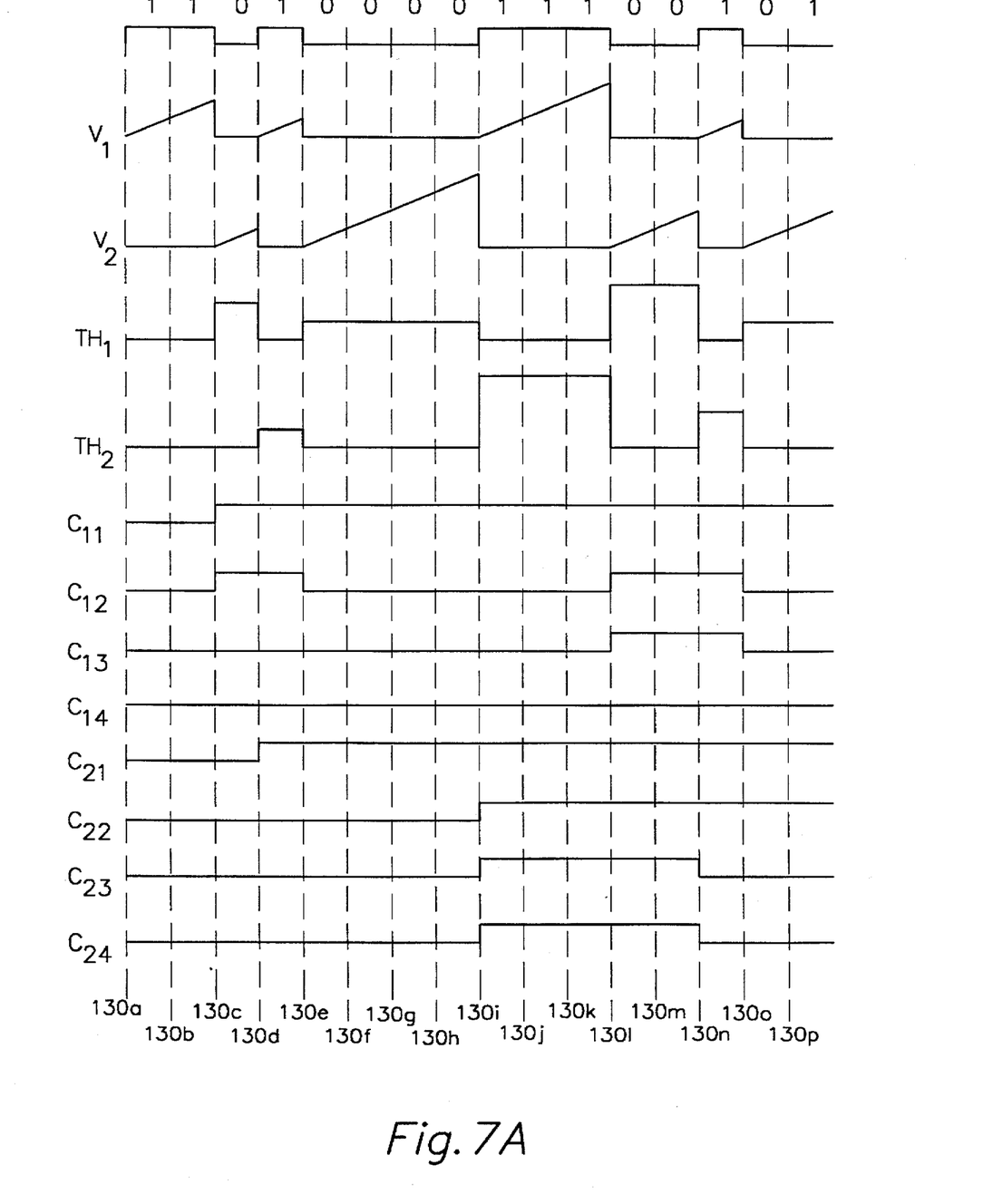
FIG. 7a is a timing diagram for the integrate, track, and hold circuit, and the voltage quantizer.

An example of the operation of the voltage quantizer 18 is shown in FIG. 7a. In time period 130a–130c, the output from integrator 22, $V_1$, rises steadily. At 130c, the encoded NRZ signal goes low and track and hold circuit 26 outputs differential voltage $TH_1$ which is equal to the final magnitude of $V_1$ at 130c. The magnitude of $TH_1$ is greater than the magnitude of $V_{ref1}$ and $V_{ref2}$, so that comparators 98 and 100 will trip. The falling edge in the encoded NRZ signal cause latches 102–108 to switch. Signals $C_{11}$ and $C_{12}$, which indicate the outputs of latches 106 and 108, are high while the outputs of latches 102 and 103, signals $C_{13}$ and $C_{14}$ respectively, remain low. During time period 130c–130d, $V_2$ has begun to steadily increase. This rise stops at 130d and $TH_2$ then rises to the final magnitude of $V_2$ for the period 130d–130e. Because $TH_2$ is only at the level indicating that one consecutive bit was received, the only comparator that trips is 116. During this time period, the other three comparators, 112, 114 and 116, remain low. At 130d, latch 124 outputs a high signal $C_{21}$, while the other latches in subquantizer 109 remain low. This process continues for time periods 30e–30p.

Figures 7B, 9A, 9B:
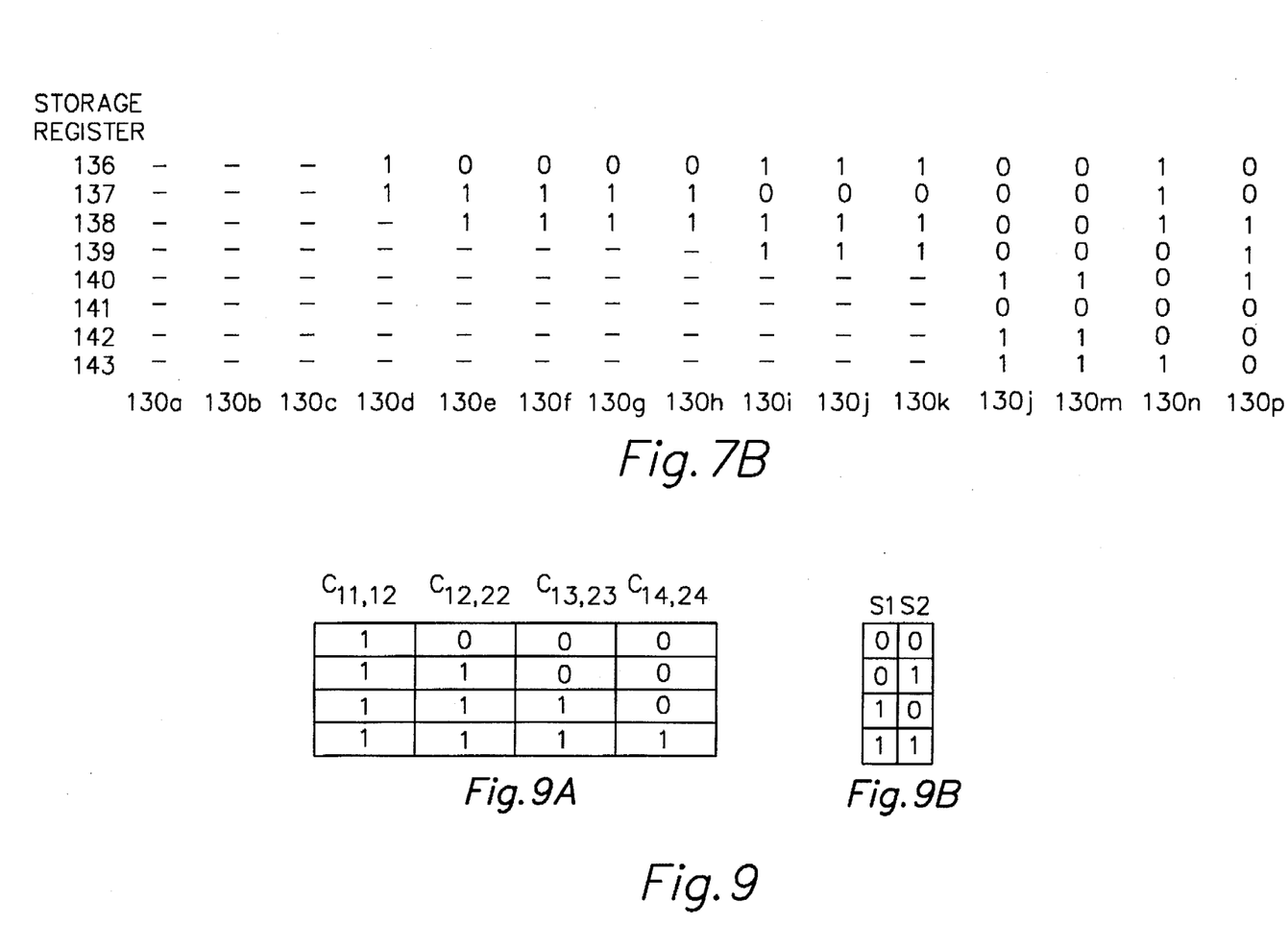
FIG. 7b is a chart of stored bits in the storage register.
FIG. 9a is a table of possible inputs to the translator and FIG. 9b is an output table for the translator.
Figure 8:
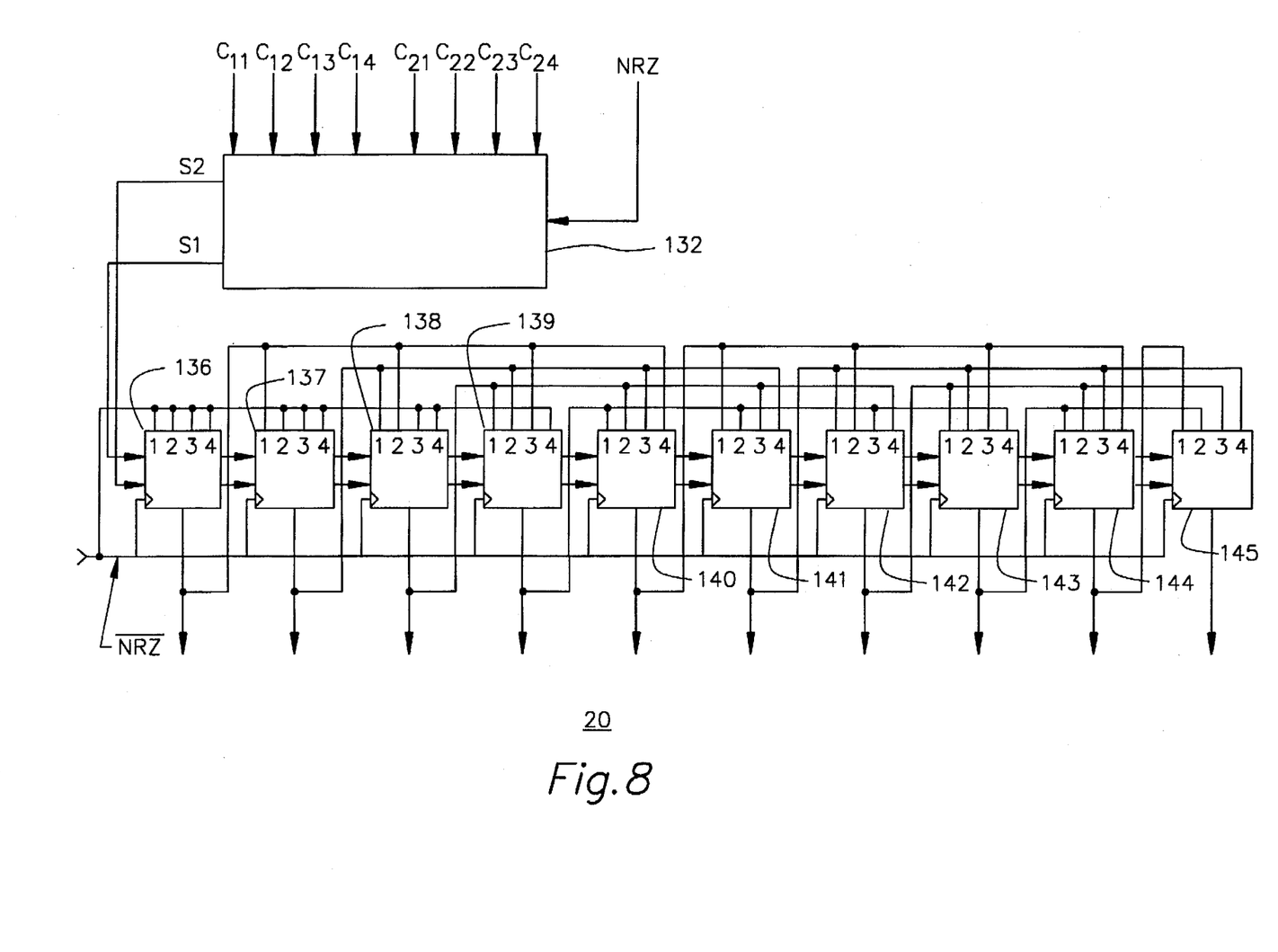
FIG. 8 is a block diagram of the digital encoder.

A block diagram for the digital encoder 20 is shown in FIG. 8. Included in the digital encoder is translator 132 as well as a series of storage registers, 136–145. Ten storage registers are shown in the FIG. 8, however this is merely a preferred embodiment of the invention and is in no way meant to limit the number of storage registers which may be included in the digital encoder. The translator 132 receives the outputs from the subquantizers 91 and 109 respectively. Each translator receives four possible sets of four signals, which are then translated into signals S1 and S2. A translation chart is shown in FIG. 9. FIG. 9a is a chart of the four possible outputs of either subquantizer. Because there are only four possible combinations, the translator can convert the incoming data to four combinations of two signals. These combinations are shown in FIG. 9b.

Figure 10:
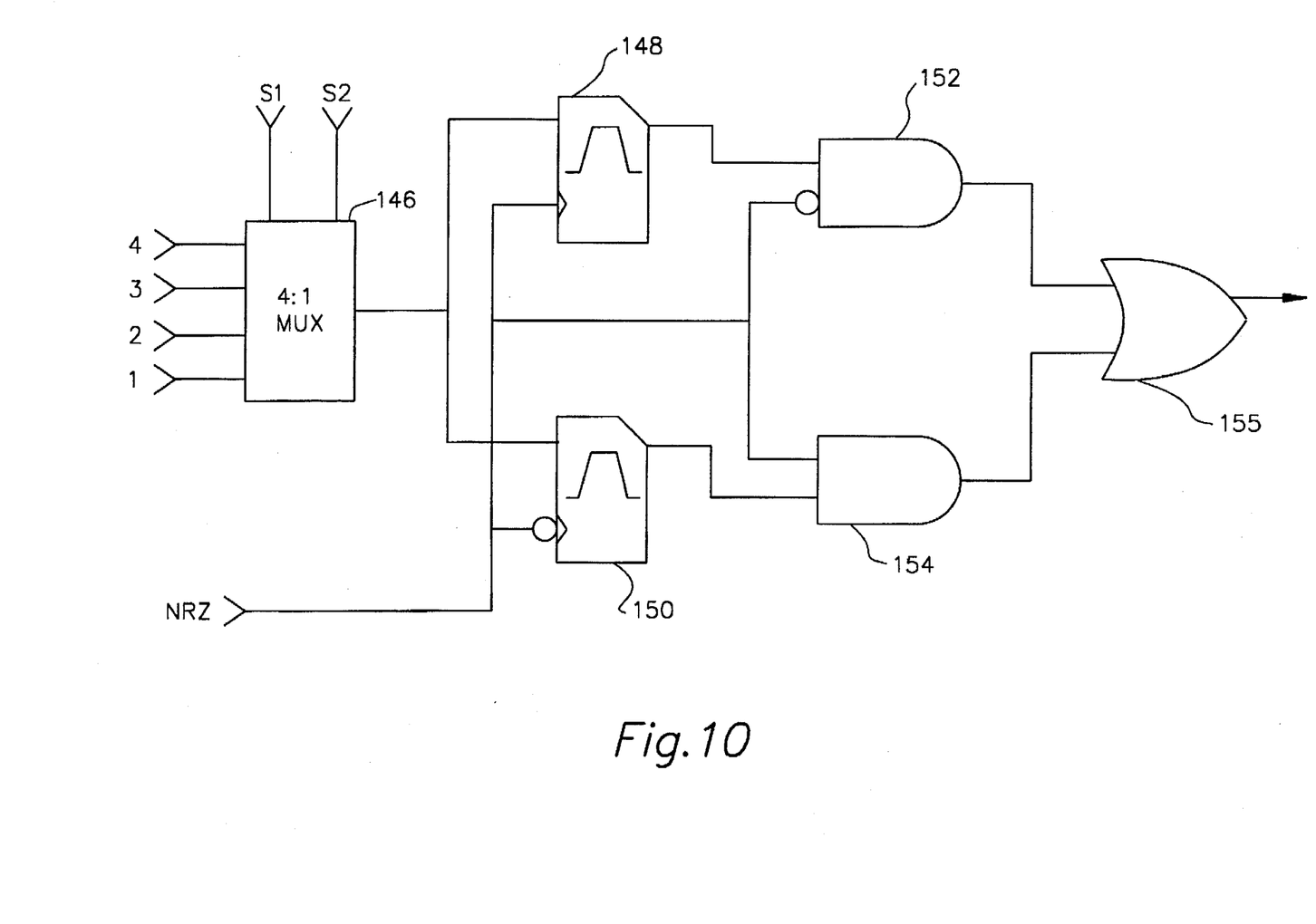
FIG. 10 is a circuit diagram for each storage unit in the digital encoder.

FIG. 10 shows a circuit diagram for one of the storage registers. Each register is comprised of a 4:1 multiplexer which outputs a signal to two transparent latches, 148 and 150. Latch 148 receives the encoded NRZ signal as its clocking signal, while latch 150 receives the complement of the encoded NRZ signal. Latch 148 will allow its output to change while the encoded NRZ signal is high, while latch 150 will allow its output to change while the encoded NRZ signal is low. The complement of the encoded NRZ signal runs to one input of AND gate 152, while the encoded NRZ signal runs to one input of AND gate 154. The output of latch 148 runs to the other input of AND gate 152, while the output of latch 150 runs to the other input of AND gate 154. The outputs of AND gates 152 and 154 comprise the two inputs of OR gate 155. The signal from OR gate 155 is the output for the shift register.

The shift register in the digital encoder 20 is constructed so that multiple bits can be passed from one series of registers to another series of registers in one step. This is different from the typical shift register which passes bits register to register, one at a time. For example, if the bit stream has two consecutive "1" bits, the bits will be input in registers 136 and 137 in one step as controlled by the NRZ data. What was previously stored in these registers will then be moved down to registers 138 and 139 in one step.

The two outputs from the translators, S1 and S2, act as control signals for the multiplexers in each of the registers. The input signals to the multiplexers in each of the registers may either be the actual encoded NRZ signal or the outputs of other registers. As is seen in FIG. 8, the data in the registers can be output in parallel form in ten bit words. The operation of the digital encoder 20 will become more apparent when explained in the context of the whole invention.

The embodiment shown in the figures is configured to receive an encoded NRZ signal encoded in 4B5B. Because there are only four comparators per subquantizer and the digital encoder is configured to receive four input signals, the decoder is limited to reading a signal with a maximum of four consecutive like bits. The decoder can easily be configured to include more or less comparators as well as providing any number of input signals to the digital encoder. Any of these changes would fall within the scope of the invention.

The operation of the system can be better understood by further study of the timing diagram in FIG. 7a as well as the data input table in FIG. 7b. In time period 130a–130c, two consecutive "1" bits are transmitted over the encoded NRZ signal. As was described above, integrator 22 will respond to the input of a "1" bit while the integrator 24 will respond to the input of a "0" bit. At 130a, integrator 22 will begin to output a ramping voltage for as long as a "1" bit is received. At 130c, a "0" bit is transmitted over the encoded NRZ signal, which causes V1 to return to zero and the integrator 24 to begin to output $V_2$. At this point, track and hold circuit 26 outputs $TH_1$, which is equal to the magnitude of $V_1$ at 130c. The voltage level of $TH_1$ will be greater than either $V_{ref1}$ or $V_{ref2}$ which will cause comparators 98 and 100 to trip and go high. The output of latches 106 and 108 will also go high, which is indicated by signals $C_{11}$ and $C_{12}$ in FIG. 7a. The output of all four latches, 102–108, will be received by translator 132. Because $C_{11}$ and $C_{12}$ are high and $C_{13}$ and $C_{14}$ are low, this will be translated into the control signal S1 being low while control signal S2 is high.

These control signals are then input into registers 136–143. The control signal from translator 132 will tell the multiplexers in each of the registers to read input signal "2". As seen in FIG. 8, input "2" for both registers 136 and 137 is directly connected to the encoded NRZ signal. For registers 138–143, they will receive the output of the register which precedes it by two. The overall effect is that registers 136 and 137 will be filled with the encoded NRZ signal, and the bits which previously fried these registers will be moved two down the line. In this first case, the signals which were in 136 and 137 will be moved to registers 138 and 139, and what was in these registers is moved two down the line, and so on.

In FIG. 7b there is shown a graphical representation of the status of each storage register during every time period. At time period 130d it is seen that "1"s are put in registers 136 and 137.

At period 130c the bit stream changes from "1" to "0". The "0" bit causes integrator 24 to begin outputting $V_2$. Between 130c and 130d the integrator 24 outputs a positively ramping $V_2$. At 130d, the encoded NRZ signal goes to "1" and $V_2$ returns to zero. $TH_2$ then rises to the final magnitude of $V_2$ at 130d. $TH_2$ will then trip comparator 116, while comparators 110, 112 and 114 will remain at "0". Correspondingly, the output from latch 124 will be high while the outputs from latches 118, 120 and 122 will be low. These four signals will be fed into the translator 132. It can be seen from FIGS. 9a and 9b that the signal combination described above will cause the translator to output a control signal of two zeros. This control signal will cause all of the multiplexers in the registers to read their "1" signal. The register 136 will read the complement of the encoded NRZ signal and store a "0". The rest of the registers will read the output of the register before it and store that signal. In this case, each register will just pass the signal along serially. As seen in FIG. 7b, the "0" is stored in register 136 and the "1" which previously occupied this register is moved to register 137. This process will continue for the time periods 130d–130p. The information stored in the shift registers can be output in parallel, or in any other desired format.

The foregoing is a description of a novel and non-obvious Bit Stream Decoder. The Applicant does not intend to limit the invention through the foregoing description, but instead define the invention through the claims appended hereto.

We claim:

1. A method for decoding an encoded non-return to zero (NRZ) signal comprising the steps of:

receiving an NRZ signal;

detecting first and second transitions in the NRZ signal;

generating a first signal which changes at a known rate upon the detection of a first transition in the NRZ signal and generating a second signal which changes in magnitude at a known rate in response to the detection of a second transition;

measuring the magnitude of the first signal at the detection of the second transition and measuring the magnitude of the second signal at the detection of the first transition;

determining the number of consecutive first bits from the magnitude of the first signal at the second transition; and determining the number of consecutive second bits from the magnitude of the second signal at the first transition.

2. The method for decoding an encoded NRZ signal of claim 1 further including the step of storing and outputting the consecutive first and second bits.

3. The method for decoding an encoded NRZ signal of claim 2 wherein at the detection of the transitions in the NRZ signal, in one step at least one of the first or second consecutive like bits is stored in particular registers within a shift register, and bits which previously occupied the particular register are moved to other registers within the shift register.

4. The method for decoding an encoded NRZ signal of claim 1 wherein the first and second signals are differential voltages.

5. The method for decoding an encoded NRZ signal of claim 4 wherein the differential voltages are compared to reference voltages to determine the number of consecutive first or second bits.

6. The method for decoding an encoded NRZ signal of claim 5 wherein the NRZ signal is encoded in 4B5B.

7. A decoder for an encoded non-return to zero (NRZ) signal comprising:

first signal output means which detects a first transition in the NRZ signal and outputs a first signal which changes in magnitude at a predetermined rate;

second signal output means which detects a second transition in the NRZ signal and outputs a second signal that changes in magnitude at a predetermined rate;

first means for measuring the magnitude of the first signal at the second transition and converting the magnitude of the first signal to a number of consecutive first bits; and second means for measuring the magnitude of the second signal at the first transition and converting the magnitude of the second signal to a number of consecutive second bits.

8. The decoder for an encoded NRZ signal of claim 7 further comprising means for storing and outputting the first and second bits.

9. The decoder for an encoded NRZ signal of claim 8 wherein the means for storing and outputting the first and second bits is a specially adapted shift register that in one step receives and stores multiple bits and in the same one step moves bits which were previously stored in the shift register to other registers within the shift register.

10. The decoder for an encoded NRZ signal of claim 7 wherein the first and second signals are differential voltages.

11. The decoder for an encoded NRZ signal of claim 10 wherein the first and second signal output means are each comprised of a differential voltage integrator and a track and hold circuit and the magnitude of the differential voltage is indicative of the number of consecutive first or second bits.

12. The decoder for an encoded NRZ signal of claim 11 wherein the first and second means for measuring and converting the first and second signals respectively are comprised of a plurality of differential voltage comparators, each of the comparators receives either the first or second reference voltage and one of a plurality of reference voltages.

13. The decoder for an encoded NRZ signal of claim 12 wherein the NRZ signal is encoded in 4B5B.

14. An apparatus for decoding an encoded non-return-to-zero (NRZ) signal comprising:

first signal output means which outputs a signal whose magnitude is proportional to the interval between first and second transitions in the NRZ signal;

second signal output means which outputs a signal whose magnitude is proportional to the interval between the second and first transitions in the NRZ signal;

first and second signal quantizers electrically connected the first and second signal output means respectively, which convert the magnitudes of the first and second signals to one or more consecutive first or second bits respectively; and storage means for storing and outputting first and second bits received from said first and second signal quantizers.

15. The apparatus for decoding an encoded NRZ signal of claim 14 wherein the first and second signals are differential voltages.

16. The apparatus for decoding an encoded NRZ signal of claim 15 wherein the first and second signal output means are each comprised of a differential voltage integrator and a track and hold circuit and the magnitude of the differential voltage is proportional of the number of consecutive first or second bits.

17. The apparatus for decoding an encoded NRZ signal of claim 14 wherein the signal quantinzing means is comprised of a plurality of differential voltage comparators, each of the comparators receives either the first or second reference voltage and one of a plurality of reference voltages.

18. The apparatus for decoding an encoded NRZ signal of claim 14 wherein the storage means is a specially adapted shift register that in one step receives and stores multiple bits from the first and second signal quantizers and in the same one step moves bits which were previously stored in the shift register to other registers within the shift register.

* * * * *